Jan. 30, 1951     A. DEBEH     2,539,946
BATTERY
Filed Aug. 14, 1945     4 Sheets-Sheet 1
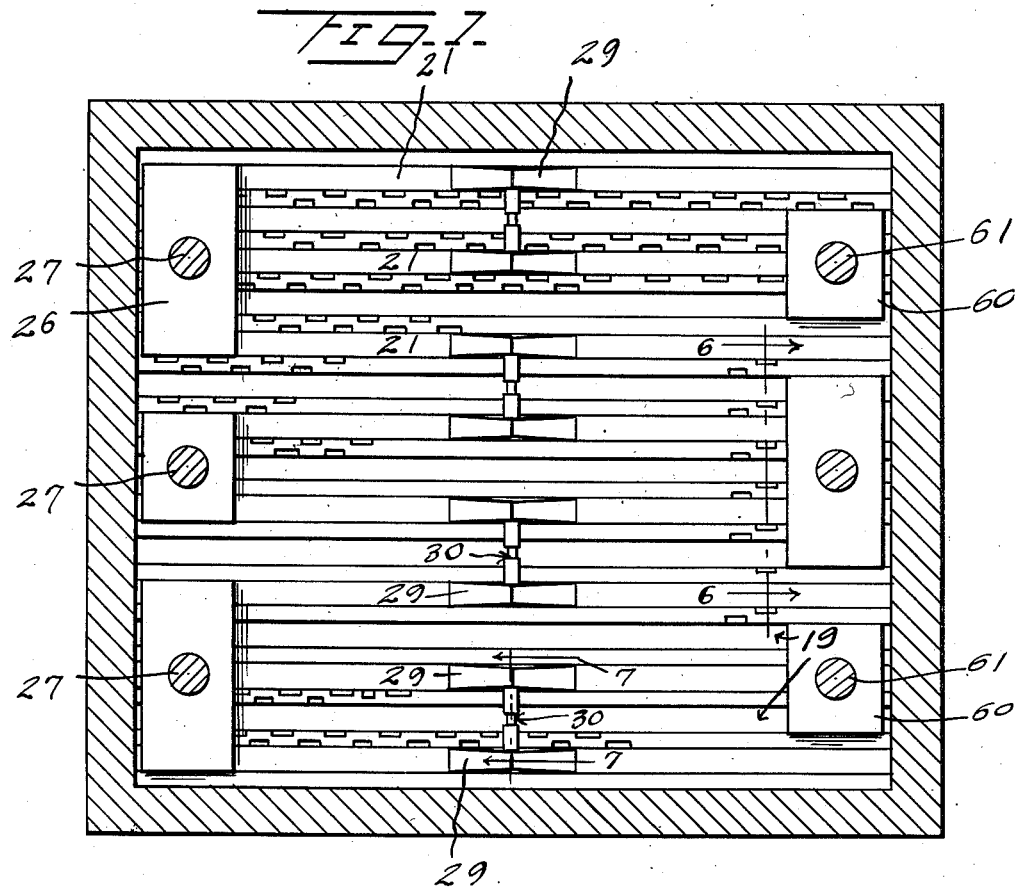
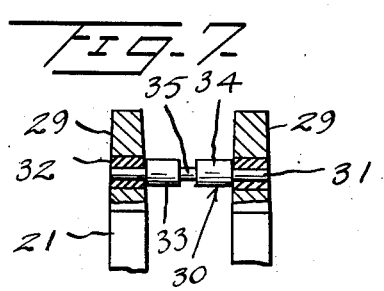
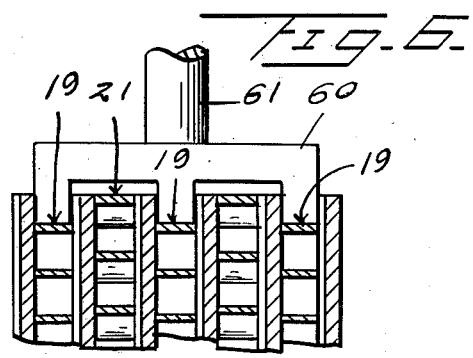
Inventor
Ali Debeh
By Kimmel & Crowell
Attorneys

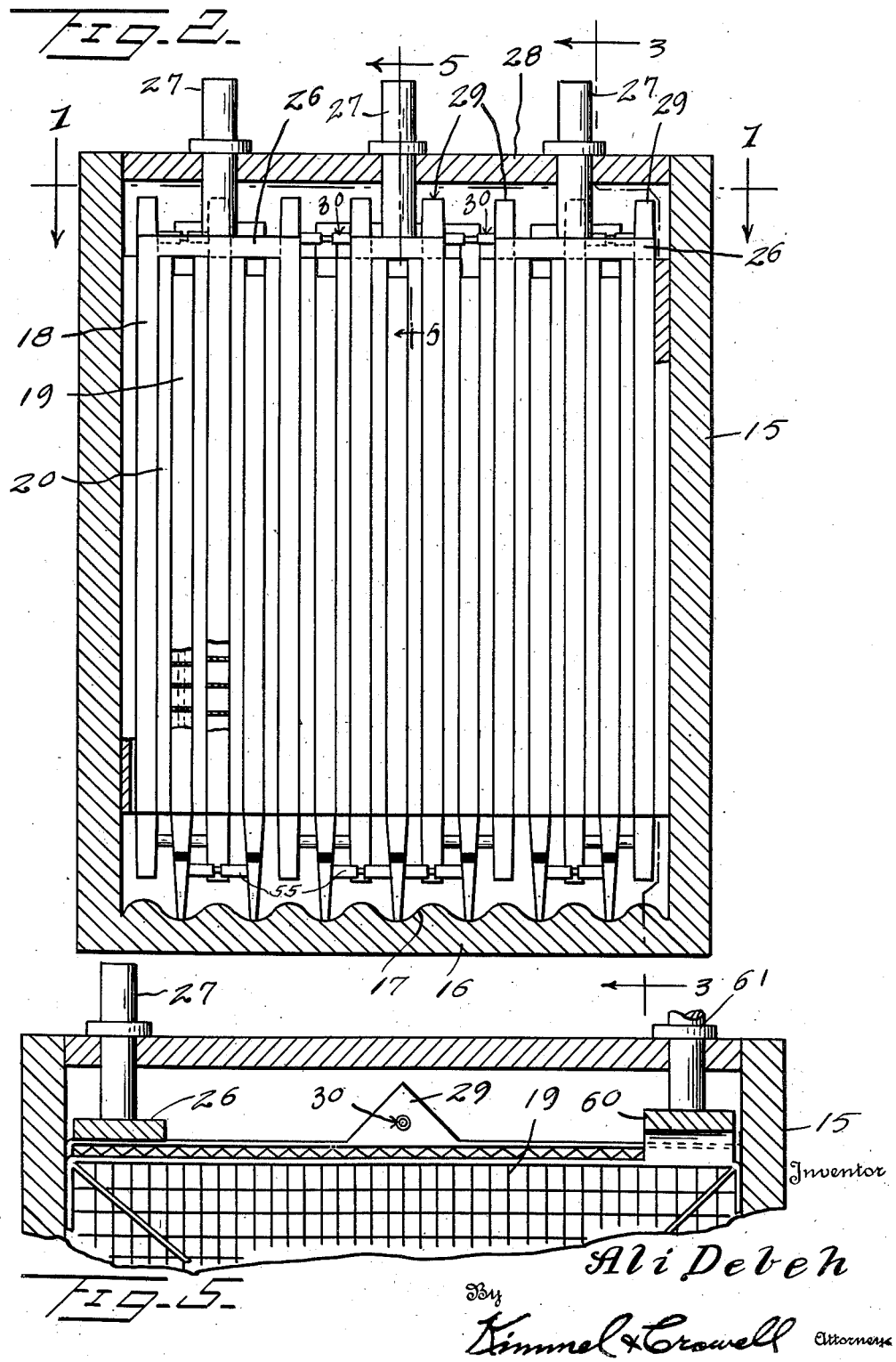

Jan. 30, 1951  A. DEBEH  2,539,946
BATTERY
Filed Aug. 14, 1945  4 Sheets-Sheet 3
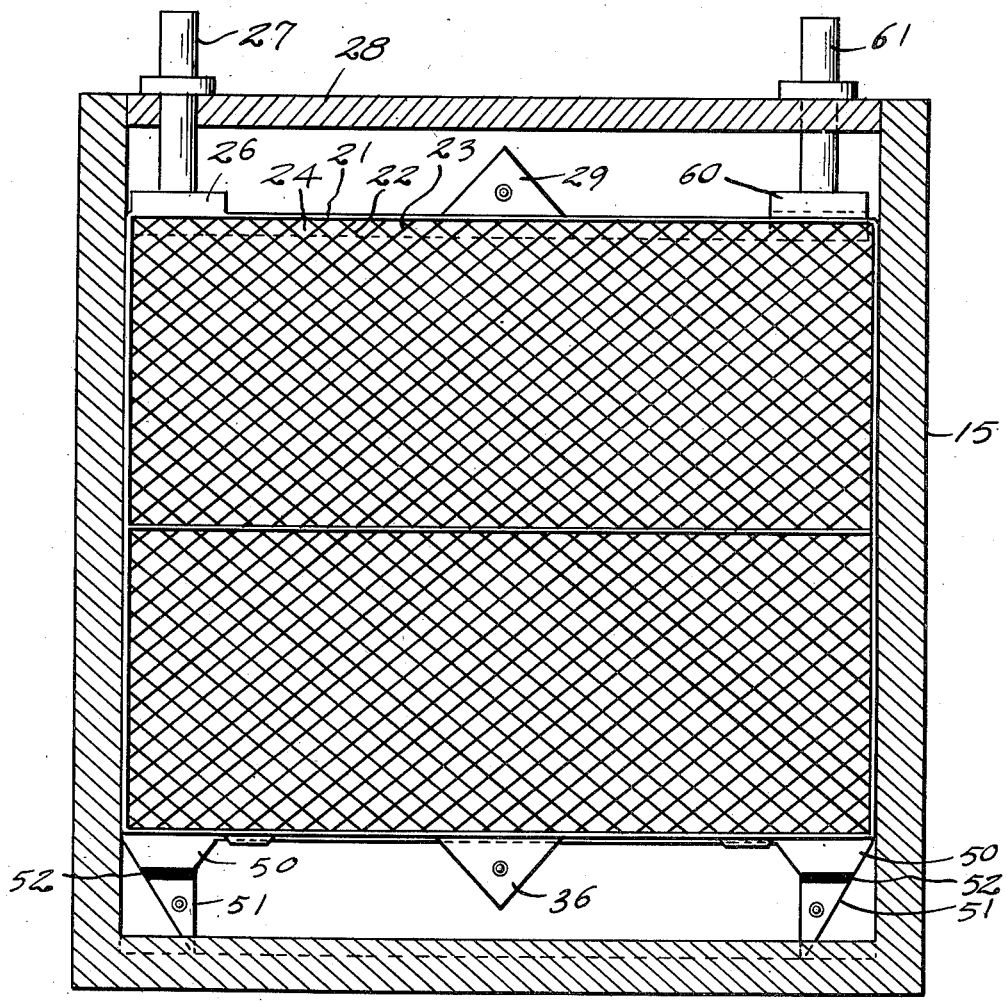
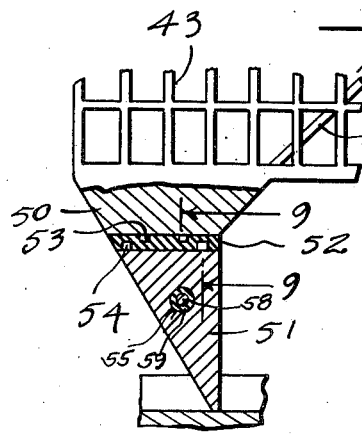
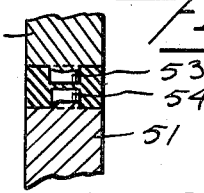
Inventor
Ali Debeh
By Kimmel & Crowell  Attorneys

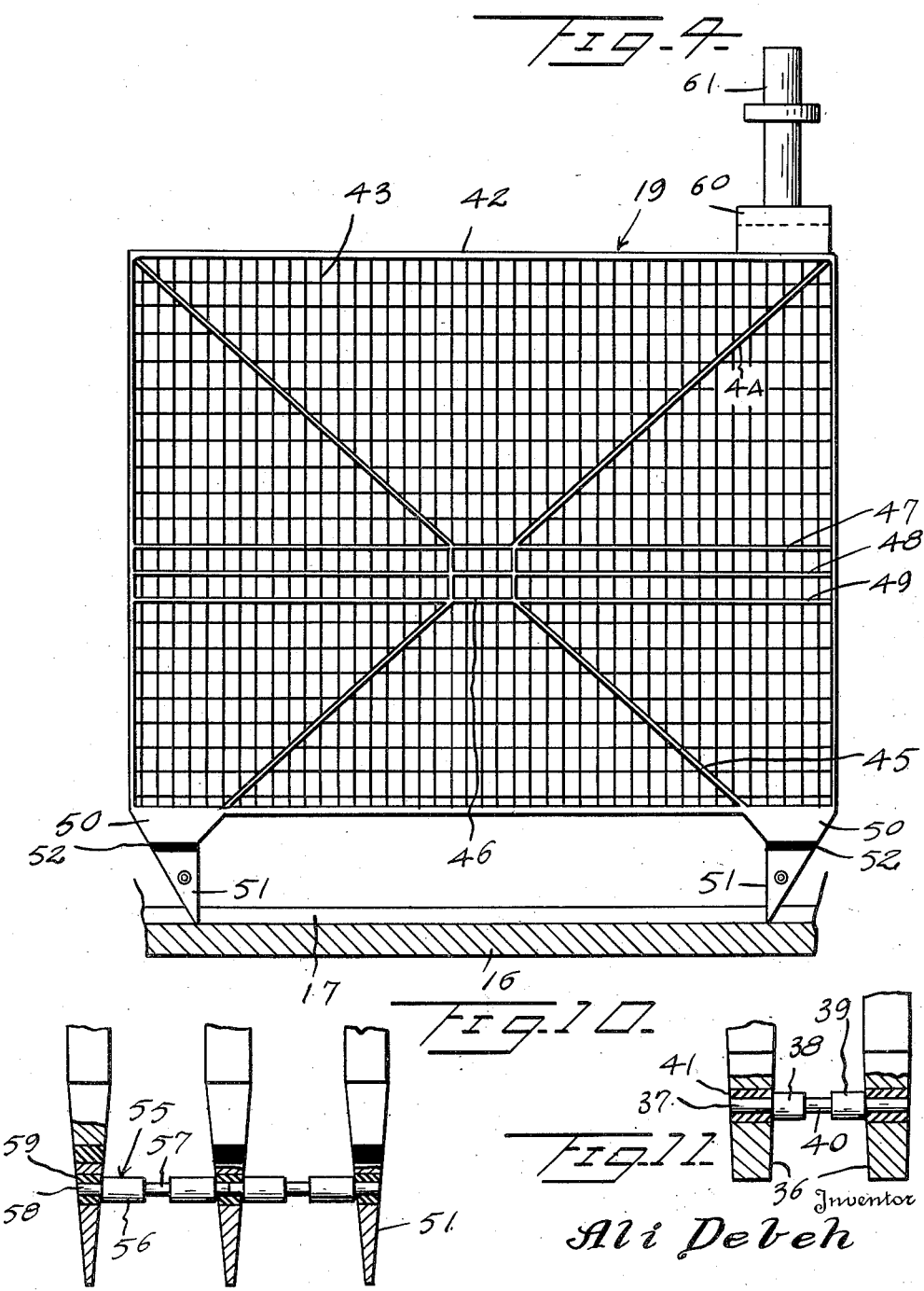

Patented Jan. 30, 1951

2,539,946

UNITED STATES PATENT OFFICE 2,539,946

BATTERY

Ali Debeh, Lake Forest, Ill.

Application August 14, 1945, Serial No. 610,747

1 Claim. (Cl. 136—81)

This invention relates to electrolyte batteries, and more particularly to a safety lock for the plates of the battery to prevent buckling of the plates.

An object of this invention is to provide an improved safety lock for both the positive and the negative plates of the battery which will lock the plates together to prevent buckling thereof, the lock being of a construction such that in the course of time the lock at the lower ends of the plates will become eaten through by the acid and accumulation of muck in the bottom of the battery, the lock maintaining the plates in spaced relation until substantially the life of the battery has passed so that the battery life will not be shortened due to the premature buckling of a plate.

A further object of this invention is to provide an improved safety lock for the positive plates of batteries which is insulated from the plates and supports the plates from the bottom of the battery wall, the support being adapted to maintain the plates at a height above the bottom wall sufficient to permit the accumulation of a considerable amount of sediment before this sediment will act to cause a short circuit in the plates of the battery.

With the foregoing objects in view, and others which may hereinafter more fully appear, the invention consists of the novel construction, combination and arrangement of parts, as will be more specifically described, and illustrated in the accompanying drawings wherein are shown embodiments of the invention, but it is to be understood that changes, variations and modifications may be resorted to which fall within the scope of the invention, as claimed.

In the drawings:

Figure 1 is a horizontal section taken substantially on the line 1—1 of Figure 2.

Figure 2 is a transverse sectional view through the battery and housing, showing the plates in elevation, with several of the plates and dividers or separators broken away and in section.

Figure 3 is a sectional view taken on the line 3—3 of Figure 2 showing the negative plate.

Figure 4 is a side elevation of one of the positive plates.

Figure 5 is a fragmentary sectional view taken on the line 5—5 of Figure 2.

Figure 6 is a fragmentary sectional view taken on the line 6—6 of Figure 1.

Figure 7 is a fragmentary sectional view taken on the line 7—7 of Figure 1.

Figure 8 is a fragmentary side elevation, partly in section, of the lower end of one positive plate.

Figure 9 is a fragmentary sectional view taken on the line 9—9 of Figure 8.

Figure 10 is a fragmentary vertical section showing the lock between the lower ends of the positive plates.

Figure 11 is a fragmentary sectional view showing the lower lock between the negative plates.

Referring to the drawings the numeral 15 designates generally a casing for a plurality of battery plates which is formed with a bottom wall 16 having a corrugated or fluted upper surface 17, as shown in Figure 2. The casing 15 has positioned therein a plurality of negative plates 18, and a plurality of positive plates 19 which are separated by means of separators 20. The separators 20 may be formed of wood, composition or other suitable material which will not only hold the negative and positive plates apart, but will prevent short circuiting of these plates.

The negative plates 18, which are shown in side elevation in Figure 3, are formed on rectangular metal frame 21, which is formed of lead and which includes a plurality of intersecting bars 22 and 23, forming lead oxide chambers 24.

A horizontally disposed central bracing bar 25 extends between the upright ends of the negative plate, and is preferably formed as a relatively heavy rib intersecting the mesh forming bars 22 and 23. A connecting bar 26 is secured to the upper end of the frame 21, and connects two or more of the negative plates together, and a terminal post 27 extends upwardly from the connecting bar 26 through the top wall 28 of the battery.

In order to provide means whereby the upper ends of the negative plates may be locked together, and held against buckling, particularly when the separators 20 become eaten through and drop down into the lower portion of the battery, I have provided a triangular keeper 29 which is formed integral with the upper side of the frame 21. The keepers 29 are locked together by means of a locking pin, generally designated as 30. The locking pin 30 (see Figure 7) is formed at the opposite ends thereof with reduced studs 31, which tightly engage in insulated bushings or sleeves 32 carried by the keeper members 29.

The locking member 30 includes a pair of relatively large diameter members 33 and 34 which are connected together by a relatively small diameter stud 35. The large diameter members 33 and 34 form shoulders at the inner ends of the studs 31 so that the keepers 29 of a pair of negative plates will be held in desired spaced apart relation.

The small diameter connecting bar or stud 35 comprises a frangible or erodible member, which is adapted to break, or to be eaten by the battery acid or sediment, but will hold the keepers 29 on the upper ends of the negative plates 21 separated for a period of time equal substantially to the life of the battery whereby failure of a negative plate will be accompanied by failure of the connecting bar allowing the plate to slip to the bottom of the casing and preventing the subjection of adjacent plates to buckling loads through the connecting bar.

Each negative plate is also provided at the lower edges thereof with a centrally disposed keeper 36 which is of triangular configuration, and is similar to the keepers 29. The lower keepers 36 are held in spaced apart relation by means of a spreader which comprises a pair of oppositely extending studs 37 carried by pins 38 and 39 and the latter are separated from each other by a frangible or erodible connecting bar 40.

The pins or studs 37 are firmly embedded in insulating sleeves 41 carried by the keepers 36. The lower lock members which comprise the pins 37, the studs or large diameter members 38, and 39, and the connecting bar 40, are adapted to be spaced above the peaks of the corrugated bottom a sufficient distance so that a considerable amount of sediment will accumulate in the space below the plates before this sediment will come into contact with the locks.

The positive plates 19, shown in side elevation in Figure 4, include a rectangular frame 42 which as an oxide mesh 43 disposed therein, and the frame 42 also has formed integral therewith diagonal bracing bars 44 and 45 which are of relatively heavy material and intersect the mesh 43.

In the center of each frame 42 there is disposed a rectangular member 46 of relatively heavy material, and a plurality of heavy, horizontally disposed bars 47, 48 and 49 extend from the ends of the rectangular center bracing member 46.

The positive plate 19, at the lower end thereof, has formed integral therewith inverted, truncated triangular feet 50 and the triangular supporting foot 51 extends downwardly from the truncated lower end of the foot 50. The interposed insulating bar 52 is disposed between the lower end of the foot 50, and the upper end of the triangular member 51, and is held between these members by studs 53 and 54, which are formed integral with the foot 50 and the supporting member 51 respectively (see Figures 8 and 9).

The supporting members 51 are adapted to be locked together by locks 55. The locks 55 are formed of metal and include a pair of pins 56 disposed in spaced apart relation and connected together at their inner ends by a small diameter connecting bar 57. The outer ends of the pins 56 are formed with studs 58, snugly engaged in insulating sleeves 59 which are fixedly carried by supporting members 51. The locks 55 are shown disposed in a plane slightly below the locks for the negative plates, but it will be understood that the negative and positive locks at the lower ends of the several plates may be in the same plane. The upper ends of the positive plates are connected together by a connecting bar 60, and the terminal post 61 extends from the connecting bar 60 through the top wall 28.

With a battery as hereinbefore described, the negative and positive plates are more firmly braced against buckling by the heavy bracing bars extending diagonally or horizontally through the frame and the plates are firmly held against buckling in the event one or more of the separators 20 becomes dislocated or disintegrates by means of the upper and lower locks connecting the negative plates together and the lower locks which connect the positive plates together.

It will be understood that the sediment which usually collects in the bottom of the battery comprises dislodged lead oxide and portions of the disintegrated separators and as the locks hereinbefore described are positioned a substantial distance above the bottom wall of the battery, these locks will hold the plates against buckling when substantial amounts of the lead oxide falls from the mesh of the plates.

In practice the locks are so positioned that when sufficient amount of sediment accumulates to cause a short circuit between the negative and positive plates, the plates are in substantially useless condition.

I claim:

In a battery having positive and negative plates and separators therefor, downwardly extending lugs on opposite sides of the lower edge of said positive plate, supporting feet insulated and depending from said lugs whereby accumulation of sediment about said feet is not effective to short out said positive plates, locking pins engaging said feet between adjacent pairs of positive plates, oppositely extending keepers on the upper and lower ends of said negative plates intermediate the length thereof, pins engaging in said keepers between adjacent pairs of negative plates, each of said pins between said positive and said negative plates being formed with a portion of reduced diameter adapted to fail when either of the plates engaged thereby buckles, whereby the buckling of one plate will not place buckling stresses on the adjacent plates.

ALI DEBEH.

REFERENCES CITED

The following references are of record in the file of this patent:

UNITED STATES PATENTS

| Number | Name | Date |
| --- | --- | --- |
| 397,557 | Knowles | Feb. 12, 1889 |
| 578,710 | Barrett | Mar. 16, 1897 |
| 589,830 | Headland | Sept. 14, 1897 |
| 1,238,755 | Ford | Sept. 4, 1917 |
| 1,379,088 | Edison | May 24, 1921 |
| 1,474,313 | Allen | Nov. 13, 1923 |
| 1,555,046 | West | Sept. 29, 1925 |
| 1,900,308 | Snyder | Mar. 7, 1933 |

FOREIGN PATENTS

| Number | Country | Date |
| --- | --- | --- |
| 1,420 | Great Britain | of 1889 |